United States Patent
Minteer

(10) Patent No.: US 7,034,604 B2
(45) Date of Patent: Apr. 25, 2006

(54) COMMUNICATIONS DEVICE POWERED FROM HOST APPARATUS

(75) Inventor: Timothy M. Minteer, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 10/391,373

(22) Filed: Mar. 17, 2003

(65) Prior Publication Data

US 2004/0183584 A1 Sep. 23, 2004

(51) Int. Cl.
 *G05F 3/08* (2006.01)
 *H02M 7/00* (2006.01)

(52) U.S. Cl. ............... 327/540; 327/531; 363/126

(58) Field of Classification Search ........ 327/530–531, 327/534–536, 538–543; 363/89, 126
See application file for complete search history.

(56) References Cited

U.S. PATENT DOCUMENTS

| | | | | | |
|---|---|---|---|---|---|
| 3,921,053 | A | * | 11/1975 | Hekimian | 363/16 |
| 5,111,379 | A | * | 5/1992 | Sharber et al. | 363/128 |
| 5,146,396 | A | * | 9/1992 | Eng et al. | 363/16 |
| 5,905,758 | A | * | 5/1999 | Schweiter et al. | 375/257 |

* cited by examiner

*Primary Examiner*—Kenneth B. Wells
*Assistant Examiner*—Terry L. Englund
(74) *Attorney, Agent, or Firm*—Cook, Alex, McFarron, Manzo, Cummings & Mehler, Ltd.

(57) ABSTRACT

A communications device, such as a transceiver, is used with a fiber optic communication line, wherein the communications device is powered from a host device. A voltage supply circuit, which comprises a full wave bridge rectifier responsive to data and control signals from the host device, produces plus and minus rectified voltage signals. First and second voltage regulators are responsive to the rectified voltage signals to produce plus and minus regulated voltages, for example ±5 volts, which is sufficient to power the communications device. A charge circuit alternately transfers energy from the plus and minus voltage lines to ensure the presence of plus and minus voltage signals when only positive or negative signals are provided by the host device.

15 Claims, 5 Drawing Sheets

COMMUNICATIONS DEVICE POWERED FROM HOST APPARATUS

TECHNICAL FIELD

This invention relates generally to devices for communication between electronic devices such as protective relays for power systems, and more specifically concerns a transceiver and similar devices which obtain power for operation from their host electronic devices.

BACKGROUND OF THE INVENTION

It is generally known that transmitter/receiver (transceiver) and other communication devices can obtain their power from a host device. Such an arrangement is described in U.S. Pat. No. 5,905,758, which is owned by the assignee of the present invention. In that arrangement, power is obtained through a serial communications port at the host device. The signals from the host device at the serial port include both EIA-232 data as well as device control signals. The EIA-232 signal standard specifies a voltage greater than or equal to ±5 volts DC, with an output resistance of 300 ohms. Many host devices include an internal +5 volt supply rail, which powers the EIA-232 driver IC (integrated circuit). The driver IC will typically include a conventional internal charge pump to produce ± volt internal voltage rails. Those voltages drive the EIA-232 signal. Due to circuit inefficiencies, however, the output voltage of the EIA-232 signal will be ±9.5 volts DC. However, most transceivers do not require that high a voltage level. In fact, many transceivers including those disclosed in the '758 patent, are easily powered with voltages down to 5 volts DC.

Many newer host devices, however, have an internal voltage rail of less than 5 volts DC, e.g. 3.3 volts DC for the drive IC. A conventional charge pump would bring these voltages up to ±6.6 volts DC. With an output resistance of 300 ohms and a typical load of 10 mA, the output voltage of the EIA-232 signal would be only 3.1 V, which is too low for many transceivers, including the '758 transceiver.

Further, the digital electronics industry has a present standard of 3.3 volts DC for IC circuits (many new electronic circuits use 3.3 volts), and the design trend is toward even lower IC voltages. Additional charge pump circuitry would be necessary, however, in the device IC's internal circuitry to produce the required voltage rails for the EIA-232 signal, if the internal supply goes lower than 3.3 volts.

In addition, in some cases, only positive or only negative EIA-232 signals are present. Many host device powered transceivers, however cannot operate with only positive or negative voltage EIA-232 signals. It would hence be desirable for a transceiver or similar communication device to be able to use power from its host device provided at low voltages, i.e. 3.3 volts DC and below, to produce the desired ± voltage rails, as well as to produce both plus and minus supply voltages when only one EIA-232 voltage is present or the EIA-232 voltage switches between positive and negative values.

SUMMARY OF THE INVENTION

Accordingly, the present invention is an improvement for a communications device used with a communications line, the communications device being powered by a host device, the improvement comprising: a full wave bridge rectifier responsive to data and/or control signals from a host device to produce at least one of (a) a positive rectified voltage signal and (b) a negative voltage rectified signal; first and second circuits responsive to said rectified voltage signals to produce at least one of positive and negative regulated voltage signals having sufficient magnitude to power the communications device; and a charge pump circuit responsive to said at least one of the positive and negative regulated voltage signals to provide both positive and negative regulated voltage signals of desired magnitude.

BEST MODE FOR CARRYING OUT THE INVENTION

Figure 1:
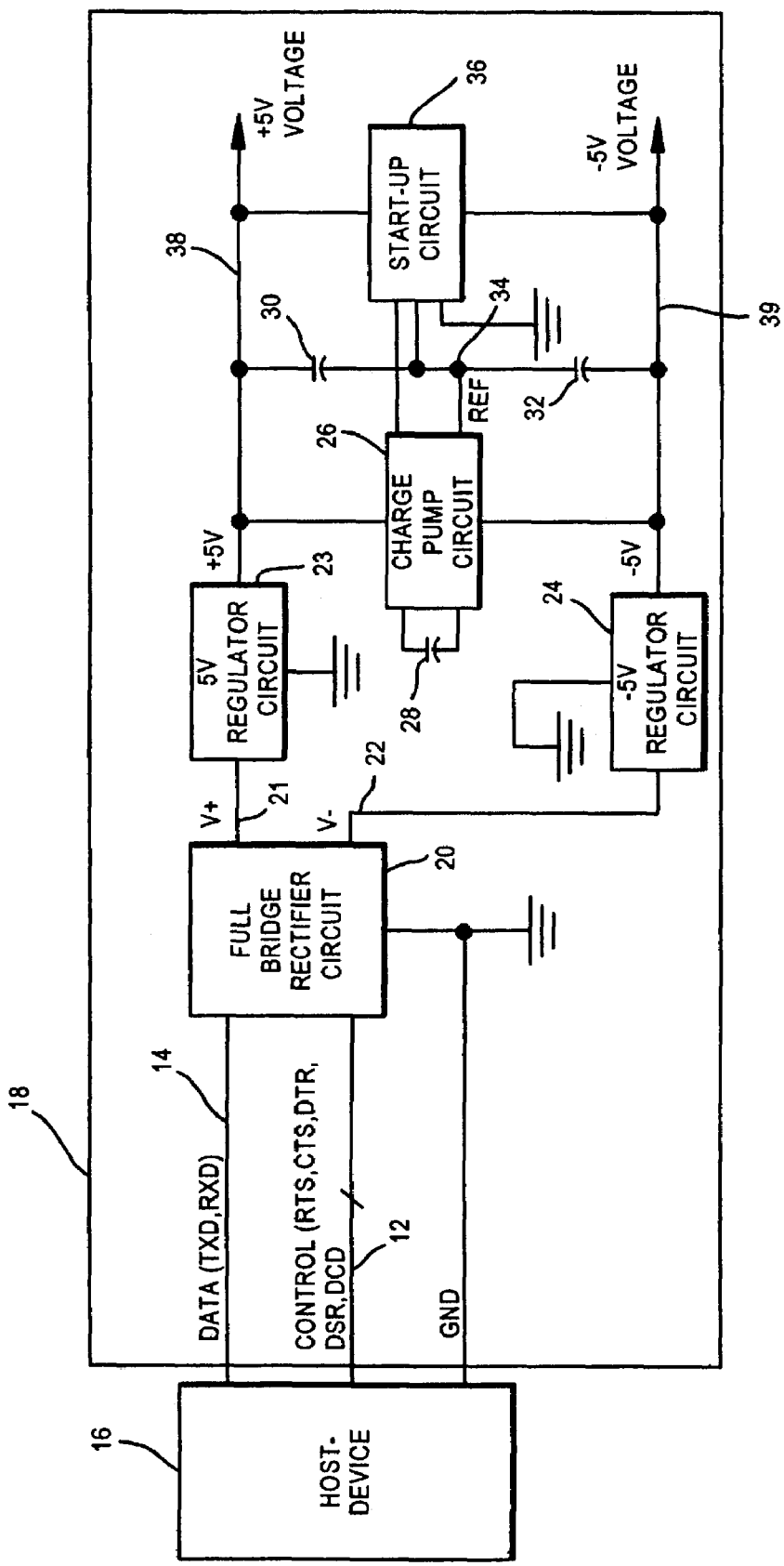
FIG. 1 is a block diagram of the system of the present invention.

FIG. 1 shows a block diagram of the voltage supply system of the present invention, shown for example in a communications line transceiver device, for producing plus and minus 5 volt supply voltages, for powering the transceiver, from data and control signals from the host device. It should be understood, however, that the invention could be used in other electronic communication devices requiring plus and minus voltages for operation. In addition, the invention can also be used in a stand-alone accessory for an electronic host device such as a protective relay for an electric power system, or similar device. In such an example, the accessory is connected to appropriate ports of the host device.

In general, the transceiver of the present invention is broadly defined as a transmitter/receiver device for communication of data and/or control signals between various electronic devices. Examples of such electronic devices are present in a variety of technical fields, including as mentioned above, protective relays, which are used on electric power transmission or distribution lines. However, it should be understood that a wide variety of host electronic devices in their various communication arrangements could use a transceiver like that described herein. Also as indicated above the invention could be used in an accessory connected to a host electronic device. In a communication context, the transceiver is designed to be used with fiber-optic communication cables, which presently are a connector of choice for communication between two electronic devices such as power system protective relays, but other types of communication lines including wire, could be used.

Referring now specifically to FIG. 1, data and control signals are available on communication lines 14 and 12, respectively, from a host device 16. The data and control signals are applied to the input side of the voltage supply circuit of the present invention, generally shown at 18, useful for instance in a transceiver device. Lines 12 and 14 are connected as inputs to a conventional full bridge rectifier circuit 20 in voltage supply circuit 18. The bridge rectifier circuit 20 may use one or all of the EIA-232 data or control signals from the host device, to produce supply voltages on lines 21 and 22. The data signals from the host device 16 on line 14 will either be TXD (transmit data) or RXD (receive data). The control signals from host device 16 on line 12 may be any of the following: RTS (request to send), CTS (clear to send), DTR (data terminal ready), DSR (data set ready) or DCD (data carrier detect). The particular data and/or control signals present will depend upon whether the host device is a DTE (data terminal equipment) or a DCE (data communications equipment).

The ± supply voltages from the full bridge rectifier 20 on lines 21 and 22 (the values will depend on the input values) are applied, respectively, to a +5 volt regulator 23 and a −5 volt regulator 24. The voltage regulators 23, 24 reduce voltages which are higher than ±5 volts from rectifier circuit 20 down to a level which is appropriate for the charge pump circuit 26. A +5 volt DC supply is provided for the logic and/or other circuits in the communication device, which may require that voltage. The ±5 volt voltage supplies are used to power the remainder of the transceiver circuitry, as described in more detail hereinafter.

The outputs of regulator circuits 23, 24 are applied to a single conventional charge pump circuit 26. Charge pump circuit 26 switches capacitor 28, referred to herein as a "flying" capacitor, alternately between capacitors 30 and 32, with capacitor 30 being a positively charged voltage capacitor and capacitor 32 being a negatively charged capacitor.

The switching action of capacitor 28 transfers energy from the −5 volt supply side from regulator 24 to the +5 volt supply side in the absence of positive EIA-232 data/control input signals and supplies energy from the +5 volt supply side to the −5 volt supply side in the absence of negative EIA-232 data/control input signals. Accordingly, regardless of the particular EIA-232 signals applied to the input of the supply circuit 18, regulated ±5 volt signals are established and maintained for powering the fiber-optic transceiver or other device of which supply circuit 18 is a part.

The output of charge pump circuit 26 with a reference to ground at 34 is applied to a start-up circuit 36. The ground reference is used when the charge pump starts switching and only negative EIA-232 signals are provided from the host.

Once the voltage across capacitor 28 is sufficient to power charge pump 26, it will start switching energy between positive and negative capacitors 30 and 32. When the charge pump circuit 26 begins switching, if there are only negative EIA-232 input signals, startup circuit 36 will connect the REF node 34 from the charge pump circuit 26 to ground, causing the voltage on capacitor 32 to increase to its full value, thereby boot-strapping the plus voltage supply to the inverted value of the minus voltage supply, on voltage rails 38 and 39, respectively.

The circuit of the present invention results in the transceiver device being powered from relatively low EIA-232 host device signal levels, i.e. even down to ±2 volts DC. Further, the circuit can produce the required plus and minus supply voltages from a single (plus or minus) EIA-232 voltage signal. The single voltage can be either positive/negative or can be switching between the two.

Figure 2:
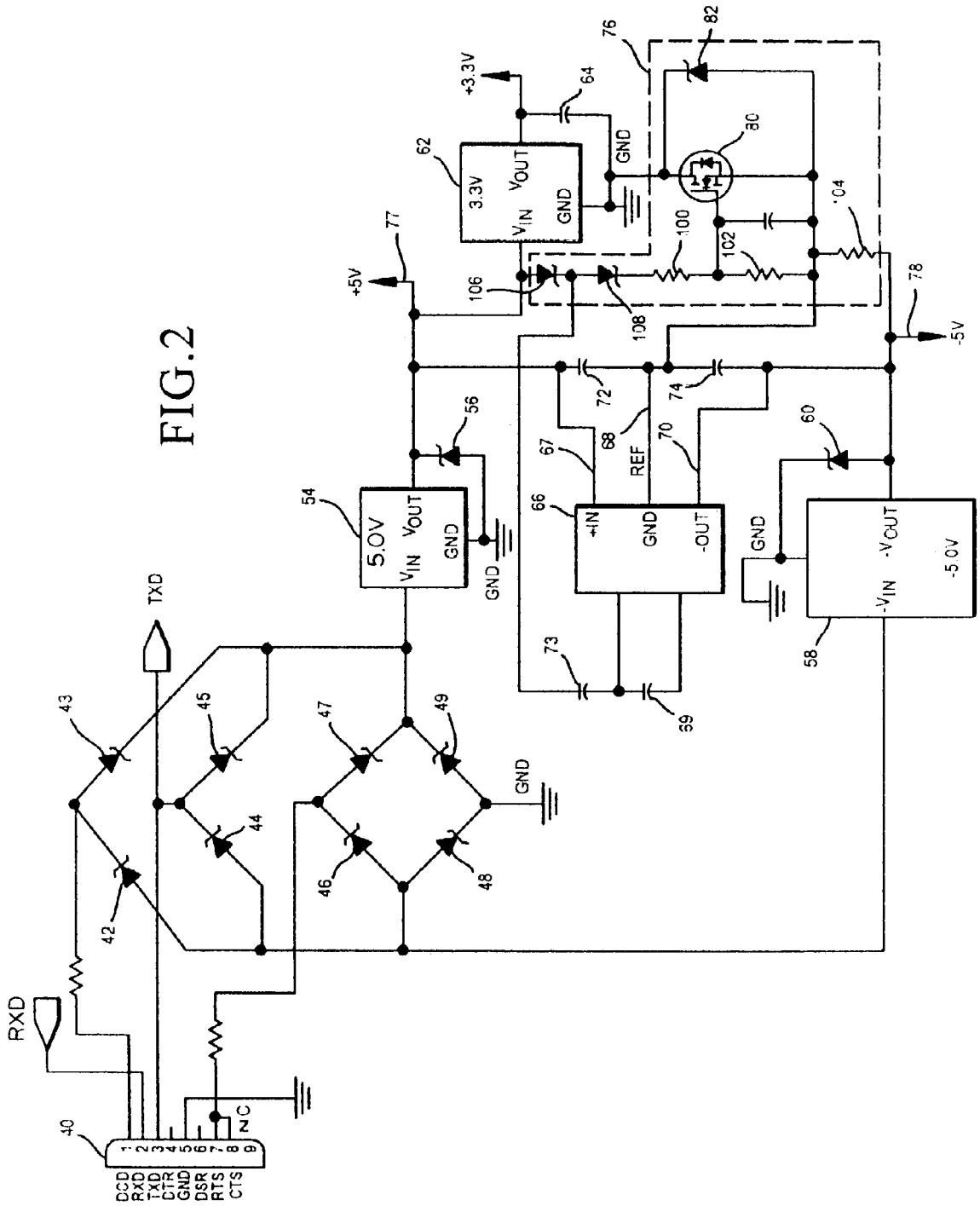
FIG. 2 is a schematic diagram of the system of the present invention.

FIG. 2 shows the schematic of the circuit of the present invention. Connector 40 has various data and control signals on its several output lines from the host device, including, for example, DCD (data carrier detect), either positive or negative, at pin 1 of the connector; RXD (receive data) on pin 2; TXD (transmit data) on pin 3; a ground connection on pin 5; RTS (request to send), either positive or negative, on pin 7; and CTS (clear to send) on pin 8. It should be understood that these particular data and control signals are illustrative only; additional signals or fewer signals could be used with the same or a different connector.

Referring still to FIG. 2, diodes 42–49 make up the full bridge rectifier referred to at 20 in FIG. 1. In the embodiment shown, diodes 42–47 are Schottky diodes, which minimize the forward voltage drop, while diodes 48 and 49 are 12-volt DC zener diodes, which clamp the positive or negative voltage rails at ±12 volts. Integrated circuit regulator 54 and diode 56 comprise the +5 volt regulator circuit 23 of FIG. 1. Circuit 54 is a low dropout regulator with a low quiescent current, which is achieved by an internal FET, which is used as a regulating switch. Diode 56 is a Schottky diode to protect any sensitive devices on the +5 voltage supply line from negative voltage levels prior to startup of circuit operation. Plus 5 volts is provided on line 77.

Integrated circuit regulator 58 and diode 60 comprise the −5 volt regulatory circuit 24 in FIG. 1 and is similar in operation to regulator 54 and diode 56; diode 60 is a Schottky diode that protects devices on the −5 volt line from positive voltages prior to start up of the circuit operation. Minus 5 volts is provided at line 78.

Circuit 62 and capacitor 64 comprise, in the embodiment shown, a 3.3-volt regulator circuit. Circuit 62 is a low dropout regulator that includes an internal FET used as a regulating switch. Capacitor 64 is for the load connected to the +3.3 volt node.

Circuit 66 comprises the charge pump circuit 26 of FIG. 1. Circuit 66 is a charge pump inverter. It powers up from the voltage across pins 67 and 68. Once charge pump circuit 66 starts operating, it switches capacitance 69 alternately first between pins 67 and 68 and then pins 68 and 70, at a frequency determined by the charge pump circuit 66, at a duty cycle of about 50%. Capacitor 69 is capacitor 28 in FIG. 1, while capacitor 72 comprises capacitance 30 and capacitor 74 comprises capacitor 32 of FIG. 1.

The start-up circuit 36 of FIG. 1 is shown at 76 in FIG. 2. The start-up circuit 76 turns on FET transistor 80 when there are only negative EIA-232 signals present from the host device and the charge pump 66 has begun operation, resulting in the bootstrapping of the +5 volt signal line 77 from the −5 volt signal line 78. Diode 82 is in the embodiment shown a Schottky diode that keeps the reference voltage node (line 68 from circuit 66) slightly above ground when only positive EIA-232 signals are present.

Figure 3:
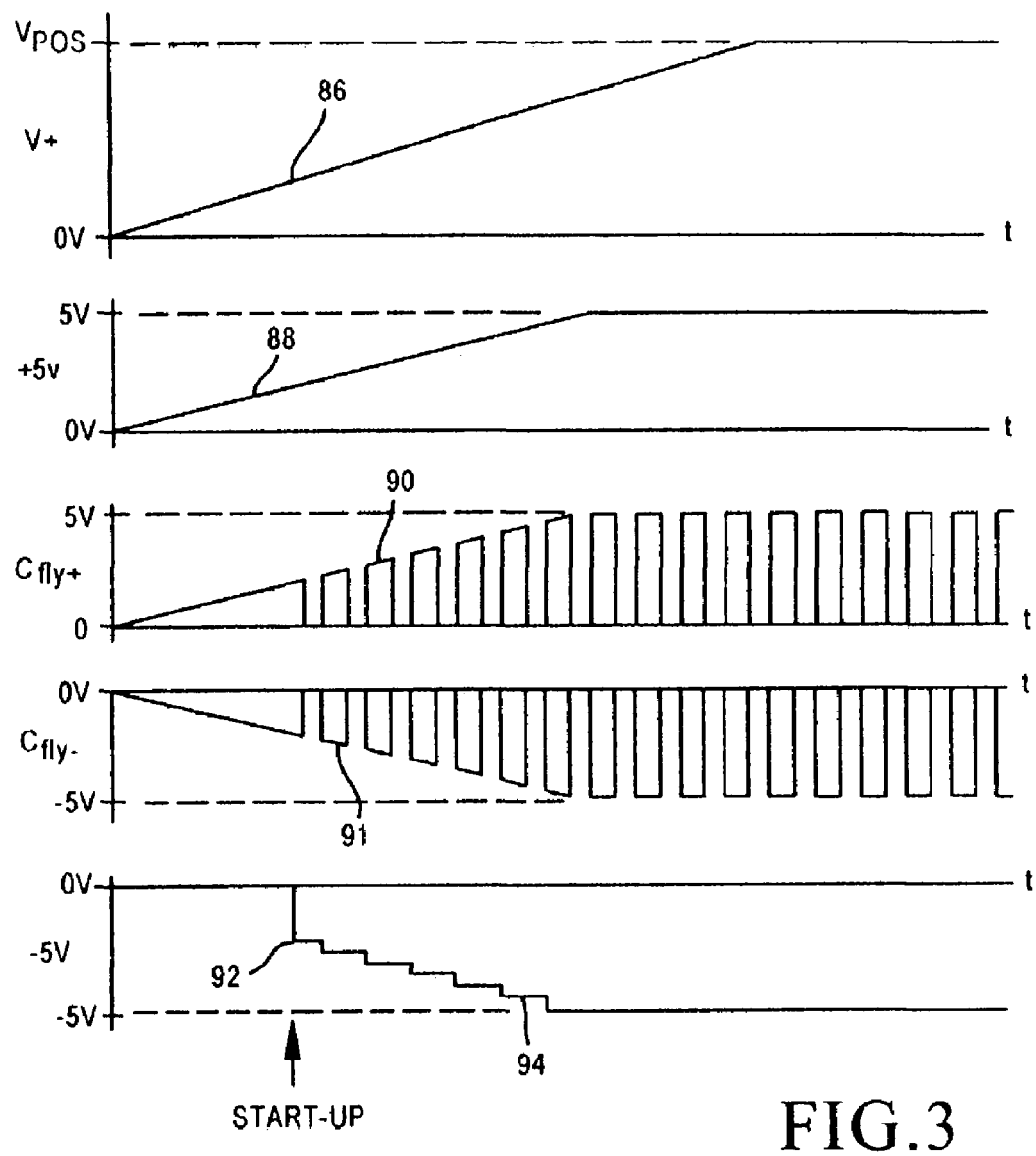
FIGS. 3 and 4 are signal diagrams showing the development of plus and minus transceiver supply voltages when only a positive voltage or only a negative voltage, respectively, are available from the host device.

The start-up timing with only positive EIA-232 signals is shown in FIG. 3. When the circuit is initially turned on, the +5 volt line 88 (from regulator 23) ramps up with the positive voltage signal 86 from the bridge rectifier (20 in FIG. 1) until that voltage reaches +5 volts DC at which point the +5-volt line signal 88 will remain at +5 volts DC due to the regulator circuit action.

The charge pump IC (26 in FIG. 1) starts operating at some minimum voltage as indicated at 92 in FIG. 3. Once the charge pump IC begins operating, the −5 volt line 94 basically becomes the inverted value of the +5 volt line 88. FIG. 3 also shows the voltage 90 at "fly" capacitor 69 (positive side) in FIG. 2 and the voltage 91 at "fly" capacitor 69 (negative side). As the charge pump operates, the −5 volt line charges toward −5 volts.

When only negative EIA-232 signals are present from the host device, and the overall circuit is initially powered on, the reference node at 68 from charge pump 66 will be roughly half of the voltage of the −5 volt line until transistor 80 turns on. The actual voltage at reference node 68, before transistor 80 turns on, is determined by the capacitance divider network 72, 74, in parallel with the resistor divider network 100, 102 and 104 through diodes 106 and 108.

When only negative EIA 232 signals from the host device are present, transistor 80 can only be turned on once the charge pump IC 66 begins operating. Once the charge pump IC starts operating and switching capacitor 69, capacitor 73 also begins to switch. This switching action causes a square wave to develop at the node point between diodes 106 and 108. The lower level of this square wave is the voltage on the +5 volt supply line 77, while the upper level is the voltage at the +5 volt node plus the difference between the +5 volt node and the reference node (line 68).

Figure 4:
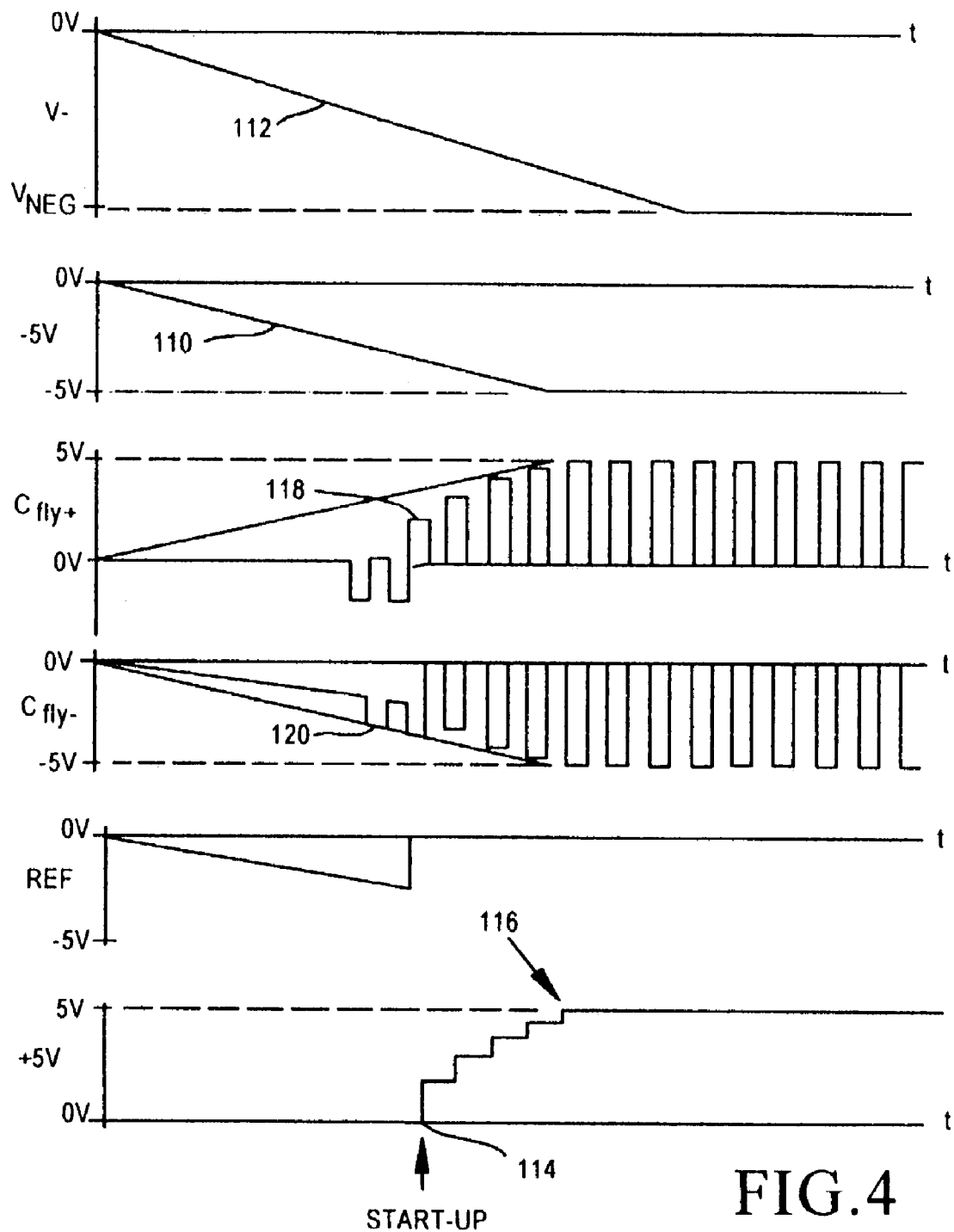

The start-up timing with only negative EIA-232 signals is shown in FIG. 4. When the circuit is initially turned on, the −5 volt line (110) ramps down coincident with the negative voltage signal 112 from the bridge circuit rectifier until the voltage from the regulator reaches −5 volts DC, from which time the −5 volt line remains at −5 volts DC. The charge pump IC 66 begins operating at some minimal voltage 114, as shown on the +5 volt line 116. Once the charge pump IC 66 begins operation, transistor 80 turns on. The +5 volt line becomes the inversion of the −5 volt line. FIG. 4 shows the voltage 118 at capacitor 69 (positive side) and voltage 120 at capacitor 69 (negative side) as the +voltage line 112 decreases.

Accordingly, the ±5 volts for the associated circuit are produced from a host device, such as a protective relay. The required ±5 volts are provided even if the internal host supply is limited to 3.3 volts or less, which would not ordinarily be sufficient to run a transceiver. The present invention operates to provide sufficient voltage to run a transceiver when the source EIA-232 voltage is low, i.e. down to ±3.3 volts or even less in some cases, and also when only one voltage (positive or negative) from the host device is present, or the output from the host device is switching between positive and negative voltages. Hence, the circuit of the present invention overcomes several disadvantages of prior art devices and, furthermore, permits the use of a transceiver device (or an accessory-type device) with a wide variety of host devices.

Figure 5:
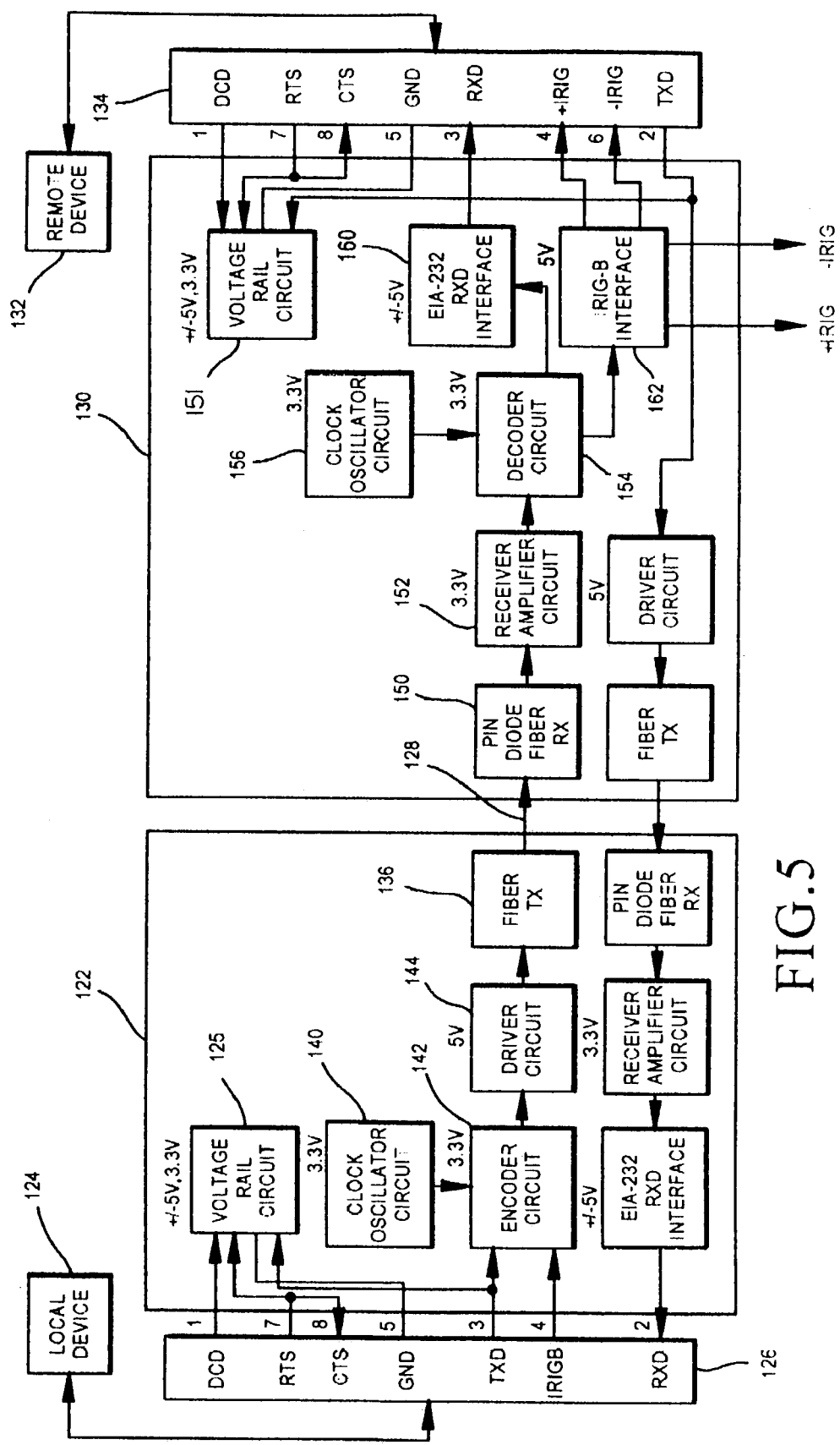
FIG. 5 is a block diagram showing a communication arrangement using device-powered transceivers of the present invention.

FIG. 5 is an example of the use of the improved transceiver of the present invention in a communication system application. A local transceiver 122 is connected to a local electronic device 124 through a connector 126. The local transceiver 122 receives data signals from local device 124, processes them and transmits them via a fiber-optic cable 128 to processes them and transmits them via a fiber-optic cable 128 to a remote transceiver 130, which is connected to a remote electronic device 132 through connector 134.

The local transceiver 122 includes a voltage supply circuit 125, which produces ±5 volts and 3.3-volt power signals to power transceiver 122, as disclosed in detail above. The local transceiver also includes conventionally a clock oscillator circuit 140, which is powered by 3.3 volts, which drives an encoder circuit 142, also powered by 3.3 volts, which in turn is responsive to the transmit data from device 124 and an IRIG-B time signal. The output of encoder circuit 142 is applied to a driver circuit 144, powered by 5 volts, which drives a fiber optic line transmit circuit 136.

At the remote transceiver 130, which obtains its power signals from its voltage circuit 151, the received signals are applied to a pin diode receiver 150, the output of which is applied to a 3.3-volt receiver/amplifier circuit 152. The amplified signals are applied to a 3.3-volt decoder circuit 154, which is controlled by a 3.3-volt clock circuit 156. Decoder circuit 154 produces EIA-232 received data as well as IRIG-B time information, as disclosed in the '758 patent. The EIA-232 data is applied to ±5 volt receiver interface 160, and then to the remote device 132 through connector 134 for processing, while the IRIG-B time information is applied to interface 162. Voltage rail circuit 151 supplies ±5 volts and 3.3 volts in accordance with the requirements of the individual circuits.

Communication from the remote device 132 through the remote transceiver 130 over fiber cable 128 to the local transceiver 122 and the local device 124 is identical to that described above. Again, the transceivers themselves are generally conventional in structure and operation, such as that disclosed in the '758 patent, with the exception of the voltage supply circuits for powering of the transceivers from their host devices. The voltage supply circuits of the present invention can be used with other communication devices and systems and even accessory-type devices.

Although a preferred embodiment of the invention has been described for purposes of illustration, it should be understood that various changes, modification and substitutions might be incorporated in the embodiment without departing from the spirit of the invention, which is defined in the claims, which follow.

What is claimed is:

1. A communication device for use with a communication line, the communication device powered by a host device, the communication device comprising:

a full wave bridge rectifier operatively coupled to the host device and responsive to at least one host output signal from the host device to produce at least one of (a) a positive rectified voltage signal and (b) a negative rectified voltage signal;

a first voltage regulator circuit configured to provide a first positive regulated signal to a positive voltage rail of the communication device in response to receipt of the positive rectified voltage signal;

a second voltage regulator circuit configured to provide a negative regulated signal to a negative voltage rail of the communication device in response to receipt of the negative rectified voltage signal; and a charge pump circuit operatively coupled to the positive voltage rail and the negative voltage rail, the charge pump circuit configured to:

provide a supplemental first positive regulated signal to the positive voltage rail and a supplemental negative regulated signal to the negative voltage rail when the at least one host output signal is a positive voltage signal, provide the supplemental first positive regulated signal to the positive voltage rail and the supplemental negative regulated signal to the negative voltage rail when the at least one host output signal is a negative voltage signal, and provide the supplemental first positive regulated signal to the positive voltage rail and the supplemental negative regulated signal to the negative voltage rail when the at least one host output signal transitions between the negative voltage signal and the positive voltage signal.

2. The communication device of claim 1, further comprising:

a first capacitor operatively coupled to the positive voltage rail and a reference node of the charge pump circuit;

a second capacitor operatively coupled to the negative voltage rail and the reference node; and a third capacitor operatively coupled to a positive switching node and a negative switching node of the charge pump circuit, wherein the charge pump circuit operates to alternately couple the third capacitor to the positive voltage rail and the negative voltage rail to transfer energy between the positive and negative voltage rails so as to establish and maintain the supplemental first positive regulated signal and the supplemental negative regulated signal to supply power for the communication device.

3. The communication device of claim 2, wherein the third capacitor is alternately coupled to the positive voltage rail one-half of a charge pump circuit operating time and alternately coupled to the negative voltage rail one-half of the charge pump circuit operating time.

4. The communication device of claim 2, further comprising a start-up circuit operatively coupled to the reference node and the positive switching node, the start-up circuit configured to connect the reference node to a ground voltage when the at least one host output signal is the negative voltage signal, connection of the reference node to the ground voltage enabling generation of the supplemental first positive regulated signal by the charge pump circuit when the at least one host output signal is the negative voltage signal.

5. The communication device of claim 2, further comprising a start-up circuit operatively coupled to the reference node and the charge pump circuit, the start-up circuit configured to connect the reference node to a ground voltage when the at least one host output signal is the negative voltage signal, connection of the reference node to the ground voltage enabling generation of the supplemental first positive regulated signal by the charge pump circuit when the at least one host output signal is the negative voltage signal.

6. The communication device of claim 5, further comprising a third voltage regulator having an input coupled to the positive voltage rail, the third voltage regulator configured to provide a second positive regulated signal to the communication device, the second positive regulated signal having a voltage lower than the first positive regulated signal.

7. The communication device of claim 6, wherein the full wave bridge rectifier, the first and second and third voltage regulator circuits and the start-up circuit are configured into at least one integrated circuit, and wherein the first, the second and the third capacitors are operatively coupled to the one integrated circuit.

8. The communication device of claim 6, wherein the first voltage regulator circuit generates a +5 volt positive regulated signal in response to receipt of the positive rectified voltage signal, wherein the second voltage regulator circuit generates a– 5 volt negative regulated signal in response to the negative rectified voltage signal, and wherein the third voltage regulator circuit generates a +3.3 volt positive regulated signal in response to the +5 volt positive regulated signal.

9. The communication device of claim 1, wherein the at least one host output signal is selected from the group consisting of a data signal and a control signal.

10. The communication device of claim 1, wherein the host device comprises a protective relay for use in a power system.

11. A voltage supply circuit for use in an electronic apparatus, the voltage supply circuit powered by a host device, the voltage supply circuit comprising:
   a full wave bridge rectifier operatively coupled to the host device and responsive to at least one host output signal from the host device to produce at least one of (a) a positive rectified voltage signal and (b) a negative rectified voltage signal;
   a first voltage regulator circuit configured to provide a first positive regulated signal to a positive voltage rail of the voltage supply circuit in response to receipt of the positive rectified voltage signal;
   a second voltage regulator circuit configured to provide a negative regulated signal to a negative voltage rail of the voltage supply circuit in response to receipt of the negative rectified voltage signal; and
   a charge pump circuit operatively coupled to the positive voltage rail and the negative voltage rail, the charge pump circuit configured to:
   provide a supplemental first positive regulated signal to the positive voltage rail and a supplemental negative regulated signal to the negative voltage rail when the at least one host output signal is a positive voltage signal,
   provide the supplemental first positive regulated signal to the positive voltage rail and the supplemental negative regulated signal to the negative voltage rail when the at least one host output signal is a negative voltage signal, and
   provide the supplemental first positive regulated signal to the positive voltage rail and the supplemental negative regulated signal to the negative voltage rail when the at least one host output signal transitions between the negative voltage signal and the positive voltage signal.

12. The voltage supply circuit of claim 11, further comprising:
   a first capacitor operatively coupled to the positive voltage rail and a reference node of the charge pump circuit;
   a second capacitor operatively coupled to the negative voltage rail and the reference node; and
   a third capacitor operative coupled to a positive switching node and a negative switching node of the charge pump circuit, wherein the charge pump circuit operates to alternately couple the third capacitor to the positive voltage rail and the negative voltage rail to transfer energy between the positive and negative voltage rails so as to establish and maintain the supplemental first positive regulated signal and the supplemental negative regulated signal to supply power for the voltage supply circuit.

13. The voltage supply circuit of claim 12, further comprising a start-up circuit operatively coupled to the reference node and the charge pump circuit, the start-up circuit configured to connect the reference node to a ground voltage when the at least one host output signal is the negative voltage signal, connection of the reference node to the ground voltage enabling generation of the supplemental first positive regulated signal by the charge pump circuit when the at least one host output signal is the negative voltage signal.

14. The voltage supply circuit of claim 12, wherein the third capacitor is alternately coupled to the positive voltage rail one-half of a charge pump circuit operating time and alternately coupled to the negative voltage rail one-half of the charge pump circuit operating time.

15. The voltage supply circuit of claim 11, wherein the at least one host output signal is selected from the group consisting of a data signal and a control signal.

* * * * *